United States Patent
Lee

(10) Patent No.: US 10,589,853 B2
(45) Date of Patent: Mar. 17, 2020

(54) UNMANNED AERIAL VEHICLE

(71) Applicant: KOREA AEROSPACE RESEARCH INSTITUTE, Daejeon (KR)

(72) Inventor: Seon-Ho Lee, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 246 days.

(21) Appl. No.: 15/565,144

(22) PCT Filed: Jul. 22, 2015

(86) PCT No.: PCT/KR2015/007603
§ 371 (c)(1),
(2) Date: Oct. 6, 2017

(87) PCT Pub. No.: WO2016/167413
PCT Pub. Date: Oct. 20, 2016

(65) Prior Publication Data
US 2018/0105266 A1    Apr. 19, 2018

(30) Foreign Application Priority Data

Apr. 13, 2015   (KR) ................. 10-2015-0051801

(51) Int. Cl.
| | |
|---|---|
| *B64C 27/52* | (2006.01) |
| *B64C 39/02* | (2006.01) |
| *F16F 15/30* | (2006.01) |
| *G05D 1/00* | (2006.01) |

(52) U.S. Cl.
CPC ............ *B64C 27/52* (2013.01); *B64C 39/024* (2013.01); *F16F 15/30* (2013.01); *G05D 1/0027* (2013.01); *G05D 1/0077* (2013.01); *B64C 2201/024* (2013.01); *B64C 2201/027* (2013.01); *B64C 2201/108* (2013.01); *B64C 2201/14* (2013.01); *B64C 2201/146* (2013.01)

(58) Field of Classification Search
CPC . B64C 27/52; B64C 39/024; B64C 2201/146; B64C 2201/027; B64C 2201/024; B64C 2201/14; B64C 2201/108; G05D 1/0077; G05D 1/0027; F16F 15/30
See application file for complete search history.

(56) References Cited

U.S. PATENT DOCUMENTS

| | | | |
|---|---|---|---|
| 7,520,466 B2 | 4/2009 | Bostan | |
| 7,959,104 B2 | 6/2011 | Kuntz | |
| 9,663,236 B1 * | 5/2017 | Shiosaki | ............... B64D 27/26 |
| | (Continued) | | |

FOREIGN PATENT DOCUMENTS

KR    10-2012-0060590 A    6/2012

*Primary Examiner* — Valentina Xavier
(74) *Attorney, Agent, or Firm* — Rabin & Berdo, P.C.

(57) ABSTRACT

A technical object of the present invention is to provide an unmanned aerial vehicle capable of performing a position movement while maintaining posture stabilization. To this end, the unmanned aerial vehicle of the present invention includes: a main body unit; a plurality of propeller motors of which the rotational speed is adjusted by the main body unit; supports which extend from the main body unit in order to support the plurality of propeller motors; propellers which are axially coupled to the plurality of propeller motors and output thrust; and tilting units which tilt rotating shafts of the propellers with respect to the main body unit.

7 Claims, 12 Drawing Sheets

(56) References Cited

U.S. PATENT DOCUMENTS

| | | | |
|---|---|---|---|
| 9,800,091 B2* | 10/2017 | Nugent, Jr. | H04B 10/807 |
| 10,065,726 B1* | 9/2018 | Phan | B64D 17/80 |
| 2006/0231675 A1 | 10/2006 | Bostan | |
| 2008/0048065 A1 | 2/2008 | Kuntz | |
| 2013/0105635 A1 | 5/2013 | Alzu'bi et al. | |
| 2016/0137304 A1* | 5/2016 | Phan | B64D 27/02 244/17.23 |
| 2016/0159471 A1* | 6/2016 | Chan | B64C 39/024 244/39 |
| 2016/0352992 A1* | 12/2016 | Saika | H04N 5/2328 |
| 2019/0084673 A1* | 3/2019 | Chen | B64C 3/56 |
| 2019/0135420 A1* | 5/2019 | Regev | B64C 27/22 |
| 2019/0233100 A1* | 8/2019 | Fisher | B64C 39/024 |

* cited by examiner

UNMANNED AERIAL VEHICLE

TECHNICAL FIELD

The present invention relates to an unmanned aerial vehicle.

BACKGROUND ART

In general, an unmanned aerial vehicle, which is also called a "drone", is an unmanned flight vehicle which is in the form of a helicopter and flies without a human pilot aboard while being guided by wireless radio waves, and the unmanned aerial vehicle has been initially developed for military purpose, but recently, the unmanned aerial vehicle is used for various purposes such as high-altitude aerial photographing and delivery.

As illustrated in FIG. 1, the unmanned aerial vehicle includes a main body unit 10 which is equipped with a main board or the like for controlling a flight operation, a plurality of motors 20 of which the rotational speed is adjusted by the main board, support frames 30 which radially diverge from the main body unit 10 in order to support the plurality of motors 20, and propellers 40 which are coupled to rotating shafts of the plurality of motors 20, respectively, and output thrust.

For example, the plurality of support frames 30 may include first, second, third, and fourth support frames 31, 32, 33, and 34 which are provided at intervals along a circumference of the main body unit 10, the plurality of motors 20 may include first, second, third, and fourth motors 21, 22, 23, and 24 which are provided at end portions of the first, second, third, and fourth support frames 31, 32, 33, and 34, respectively, and the plurality of propellers 40 may include first, second, third, and fourth propellers 41, 42, 43, and 44 which are coupled to rotating shafts of the first, second, third, and fourth motors 21, 22, 23, and 24, respectively.

Hereinafter, an operation of the unmanned aerial vehicle in the related art will be described with reference to FIGS. 1 and 2.

FIG. 2 is a view illustrating a principle of the position movement of the unmanned aerial vehicle in the related art.

First, the position movement of the unmanned aerial vehicle in a state in which the unmanned aerial vehicle is in the air will be described. As illustrated in FIG. 2, thrust (denoted by 53) of the third propeller 43 generated by the third motor 23 is adjusted to be higher than thrust (denoted by 51) of the first propeller 41 generated by the first motor 21, such that the posture of the unmanned aerial vehicle is tilted downward (denoted by 60, leftward in FIG. 2) toward the first motor, and the position of the unmanned aerial vehicle is translationally moved (denoted by 70).

In addition, how to maintain the horizontal posture of the unmanned aerial vehicle in the state in which the unmanned aerial vehicle is in the air will be described. As illustrated in FIG. 1, the horizontal posture of the unmanned aerial vehicle may be maintained by decreasing the rotational speed when the unmanned aerial vehicle descends and by increasing the rotational speed when the unmanned aerial vehicle ascends while equally adjusting the rotational speeds of the motors 20.

However, the unmanned aerial vehicle in the related art has the following problems.

There is a problem in that additional undesired rotational motion (pitching, denoted by "60" in FIG. 2) occurs inevitably when the unmanned aerial vehicle translationally moves (denoted by "70" in FIG. 2). For example, there is a problem in that in a case in which distances and heights between the unmanned aerial vehicles positioned in a front and rear direction, an up and down direction, or a left and right direction are adjusted during a group flight when a number of unmanned aerial vehicles fly, there is a risk of collision due to the rotational motion (denoted by 60), a long period of time is required for docking and there is a risk of collision due to the rotational motion (denoted by 60) when allowing the unmanned aerial vehicle to dock with another unmanned aerial vehicle in the air, or it is difficult to precisely operate the unmanned aerial vehicle and operation time is increased due to the rotational motion (denoted by 60) caused by the position movement when performing various tasks or operations between the air and the ground such as aerial photographing.

In addition, there is a problem in that because the posture of the unmanned aerial vehicle is maintained only by controlling the rotational speeds of the motor 20, the posture of the unmanned aerial vehicle cannot return to the original posture when disturbance occurs, that is, when external force is applied.

DISCLOSURE

Technical Problem

A technical object of the present invention is to provide an unmanned aerial vehicle capable of performing a position movement while maintaining posture stabilization.

Another technical object of the present invention is to provide an unmanned aerial vehicle capable of maintaining posture stabilization even though external force is applied.

Technical Solution

To achieve the aforementioned objects, the unmanned aerial vehicle according to the exemplary embodiment of the present invention includes: a main body unit; a plurality of propeller motors of which the rotational speed is adjusted by the main body unit; supports which extend from the main body unit in order to support the plurality of propeller motors; propellers which are axially coupled to the plurality of propeller motors and output thrust; and tilting units which tilt rotating shafts of the propellers with respect to the main body unit.

A rotation axis of each of the tilting units may be perpendicular to the rotating shaft of each of the propellers.

Each of the tilting units may have a single rotation axis or multiple rotation axes.

Each of the tilting units may be provided between each of the supports and each of the propeller motors.

Each of the supports may have two divided portions, and each of the tilting units may be connected to each of the divided portions.

The main body unit may include: a main body which defines an external appearance; a communication module which is provided in the main body and communicates with an external remote controller; a control module which is provided in the main body and controls the plurality of propeller motors; a sensor module which is provided in the main body and includes a camera; and a battery which is provided in the main body and supplies electric power to the communication module, the control module, and the sensor module, and the control module may further include a tilt control unit which controls the tilting units.

The unmanned aerial vehicle according to the exemplary embodiment of the present invention may further include a horizontality maintaining unit which maintains a horizontal posture of the main body unit when the unmanned aerial vehicle is in the air.

The horizontality maintaining unit may include: a flywheel motor which is provided on the main body unit; and a flywheel which is axially coupled to the flywheel motor.

A rotation axis of the flywheel may be perpendicular to an upper surface of the main body unit.

Effect

As described above, the unmanned aerial vehicle according to the exemplary embodiments of the present invention may have the following effects.

According to the exemplary embodiments of the present invention, there is provided the technical configuration including tilting units for tilting the rotating shafts of the propellers with respect to the main body unit, such that the position movement is enabled by means of the propellers rotated by the tilting units without tilting the main body unit, and as a result, it is possible to move the position of the unmanned aerial vehicle while maintaining posture stabilization of the main body unit. Therefore, for example, it is possible to improve stability against collision of the unmanned aerial vehicle because the main body unit is not tilted in a case in which distances and heights between the unmanned aerial vehicles positioned in a front and rear direction, an up and down direction, or a left and right direction are adjusted during a group flight when a number of unmanned aerial vehicles fly, it is possible to improve docking accuracy and reduce the time required for the docking because the main body unit is not tilted in a case in which the unmanned aerial vehicle docks with another unmanned aerial vehicle in the air, it is possible to improve operation precision and reduce operation time because the main body unit is not tilted in a case in which various tasks or operations between the air and the ground such as aerial photographing are performed, and particularly, it is possible to improve quality of captured images by reducing geometric distortion when performing photographing.

In addition, according to the exemplary embodiments of the present invention, the horizontality maintaining unit is further included, and as a result, it is possible to maintain the posture stabilization even though external force is applied due to disturbance.

BEST MODE

Hereinafter, exemplary embodiments of the present invention will be described in detail with reference to the accompanying drawings so that those skilled in the technical field to which the present invention pertains may easily carry out the exemplary embodiment. However, the present invention may be implemented in various different ways, and is not limited to the exemplary embodiments described herein.

Figure 1:
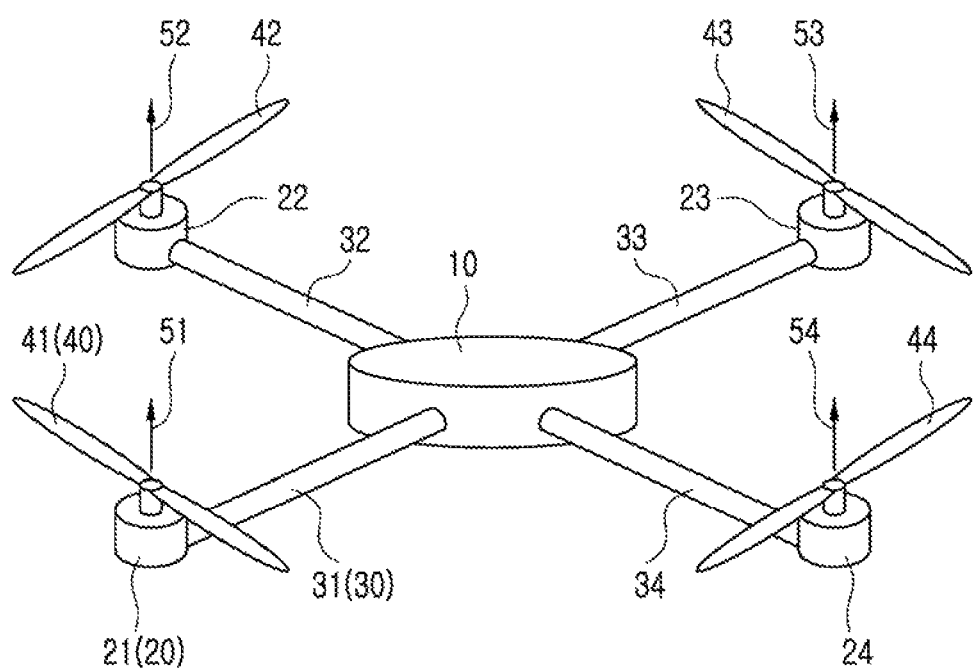
FIG. 1 is a perspective view schematically illustrating an unmanned aerial vehicle in the related art.
Figure 2:
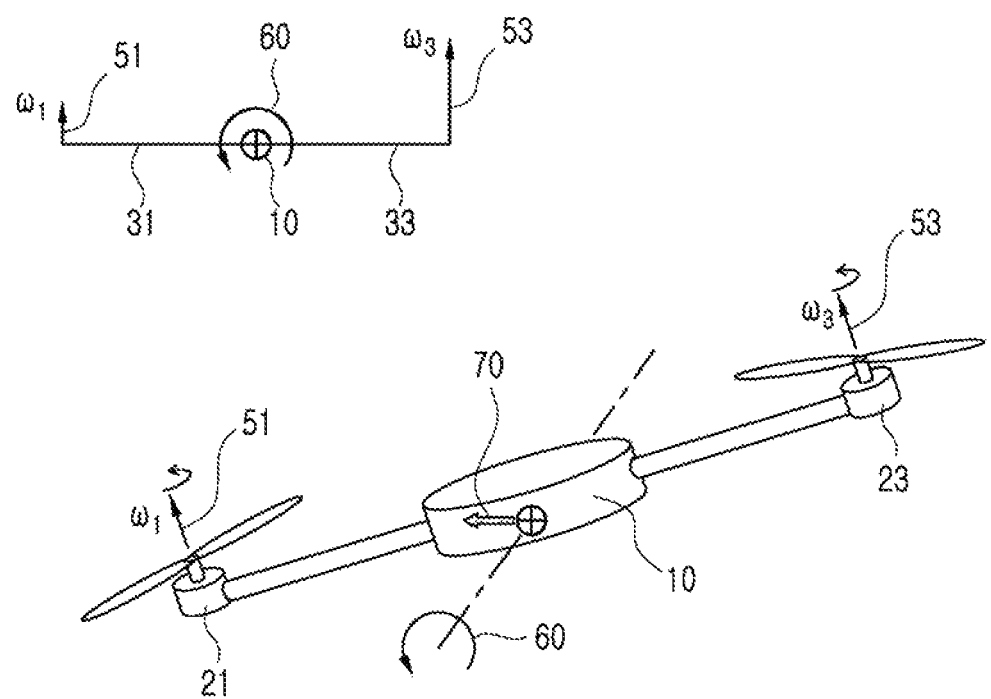
FIG. 2 is a view illustrating a principle of the position movement of the unmanned aerial vehicle in FIG. 1.
Figure 3:
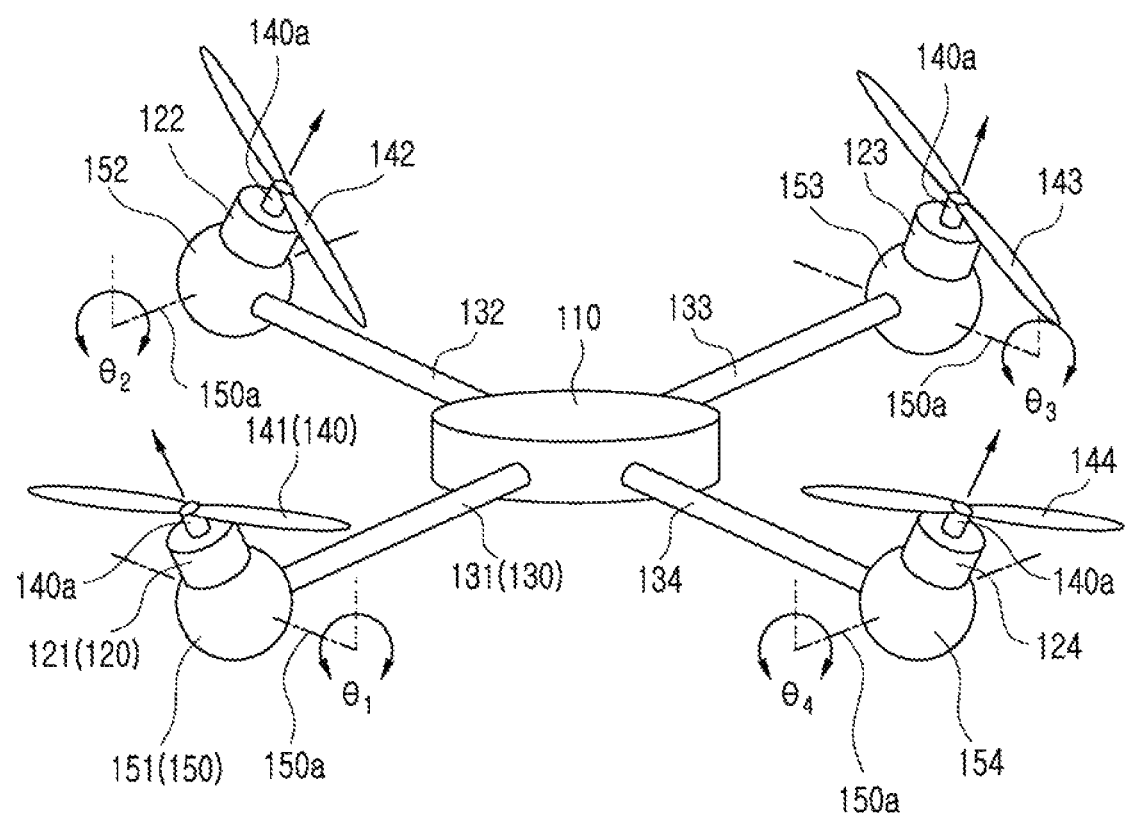
FIG. 3 is a perspective view schematically illustrating an unmanned aerial vehicle according to an exemplary embodiment of the present invention.
Figure 4:
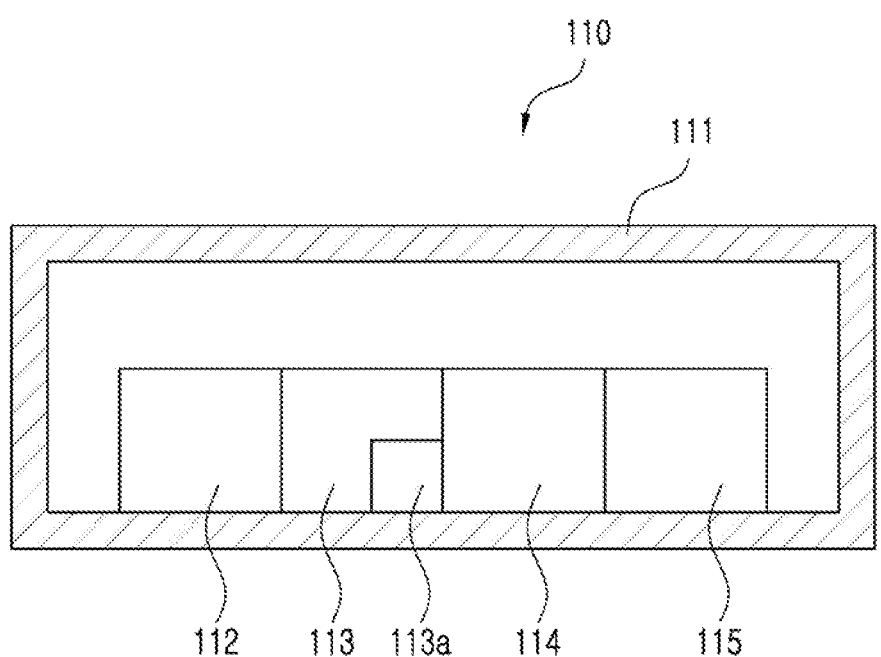
FIG. 4 is a cross-sectional view schematically illustrating a main body unit of the unmanned aerial vehicle in FIG. 3.

FIG. 3 is a perspective view schematically illustrating an unmanned aerial vehicle according to an exemplary embodiment of the present invention, and FIG. 4 is a cross-sectional view schematically illustrating a main body unit of the unmanned aerial vehicle in FIG. 3.

As illustrated in FIGS. 3 and 4, the unmanned aerial vehicle according to the exemplary embodiment of the present invention includes a main body unit 110, a plurality of propeller motors 120, a plurality of supports 130, a plurality of propellers 140, and a plurality of tilting units 150. Hereinafter, the constituent elements will be described in detail still with reference to FIGS. 3 and 4.

As illustrated in FIG. 3, the main body unit 110 is positioned at a center of the plurality of supports 130 and serves to control the plurality of propeller motors 120 and the plurality of tilting units 150. For example, as illustrated in FIG. 4, the main body unit 110 may include a main body 111, a communication module 112, a control module 113, a sensor module 114, and a battery 115.

The main body 111 serves to define an external appearance of the main body unit 110, the communication module 112 is provided in the main body 111 and serves to communicate with an external remote controller (not illustrated) and the like, the control module 113 is provided in the main body 111 and serves to control the plurality of propeller motors 120, the sensor module 114 is provided in the main body 111, includes a camera or a GPS, and serves to allow various operations to be performed, and the battery 115 is provided in the main body 111 and serves to supply electric power to the communication module 112, the control module 113, and the sensor module 114. Further, the control module 113 may further include a tilt control unit 113a which controls the tilting units 150.

The rotational speeds of the plurality of propeller motors 120 are adjusted by the control module 113, and the plurality of propeller motors 120 is rotated by being supplied with electric power from the battery 115 of the main body unit 110 through a harness (not illustrated) or the like. For example, in a case in which the unmanned aerial vehicle is a quadrotor-type unmanned aerial vehicle, the plurality of propeller motors 120 may include first, second, third, and fourth propeller motors 121, 122, 123, and 124, as illustrated in FIG. 3. The quadrotor-type unmanned aerial vehicle is described as an example for ease of description, and the technology of the present invention may be applied to all of the tri-rotor-type, penta-rotor-type, hexa-rotor-type, and octo-rotor-type unmanned aerial vehicles.

The supports 130 extend from the main body unit 110 in order to support the propeller motors 120. For example, in the case in which the unmanned aerial vehicle is the quadrotor-type unmanned aerial vehicle, the plurality of supports 130 may include first, second, third, and fourth supports 131, 132, 133, and 134 to support the first, second, third, and fourth propeller motors 121, 122, 123, and 124, as illustrated in FIG. 3.

The propellers 140 are axially coupled to the propeller motors 120, respectively, and serve to output thrust. For example, in the case in which the unmanned aerial vehicle is the quadrotor-type unmanned aerial vehicle, the plurality of propellers 140 may include first, second, third, and fourth propellers 141, 142, 143, and 144 which are axially coupled to the first, second, third, and fourth propeller motors 121, 122, 123, and 124, as illustrated in FIG. 3.

The tilting units 150 serve to tilt the rotating shafts 140$a$ of the propellers 140 with respect to the main body unit 110, respectively. Although not illustrated, the tilting unit 150 includes a tilt shaft (not illustrated) which defines a rotation axis 150$a$ of the tilting unit 150, and a tilt motor (not illustrated) which tilts the rotating shaft 140$a$ about the tilt shaft. Further, in the case in which the unmanned aerial vehicle is the quadrotor-type unmanned aerial vehicle, the plurality of tilting units 150 may include first, second, third, and fourth tilting units 151, 152, 153, and 154 which tilt the rotating shafts 140$a$ of the first, second, third, and fourth propellers 141, 142, 143, and 144, as illustrated in FIG. 3.

In particular, the rotation axis 150$a$ of each of the tilting units 150 may be perpendicular to the rotating shaft 140$a$ of each of the propellers 140. That is, the rotation axes 150$a$ of the first, second, third, and fourth tilting units 151, 152, 153, and 154 may be perpendicular to the rotating shafts 140$a$ of the first, second, third, and fourth propellers 141, 142, 143, and 144, respectively. In the case in which the rotation axes 150$a$ of the first, second, third, and fourth tilting units 151, 152, 153, and 154 are set to be perpendicular to the rotating shafts 140$a$ of the first, second, third, and fourth propellers 141, 142, 143, and 144, respectively, an algorithm of the control module 113 may be simplified.

In addition, as illustrated in FIG. 3, the tilting unit 150 may be provided between the support 130 and the propeller motor 120. For example, the first tilting unit 151 may be provided between the first support 131 and the first propeller motor 121, the second tilting unit 152 may be provided between the second support 132 and the second propeller motor 122, the third tilting unit 153 may be provided between the third support 133 and the third propeller motor 123, and the fourth tilting unit 154 may be provided between the fourth support 134 and the fourth propeller motor 124.

In addition, the rotation axis 150$a$ of each of the tilting units 150 may be placed perpendicular to a longitudinal direction of each of the supports 130. Therefore, the rotating shaft 140$a$ of each of the propellers 140 may be tilted toward the main body unit 110, or may be tilted oppositely in a radial direction of the main body unit 110.

Hereinafter, a principle of moving the unmanned aerial vehicle according to the exemplary embodiment of the present invention will be described with reference to FIGS. 5 and 6.

Figure 5:
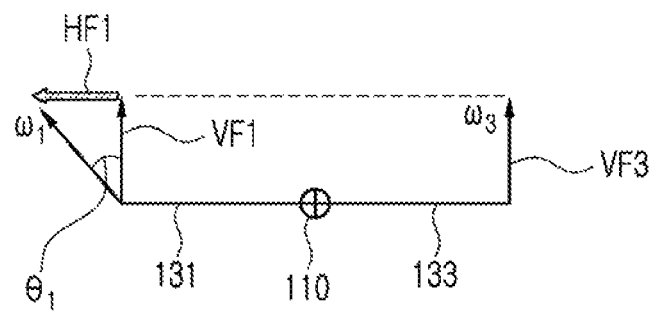
FIG. 5 is a view illustrating an example of a principle of the position movement of the unmanned aerial vehicle in FIG. 3.
Figure 5:
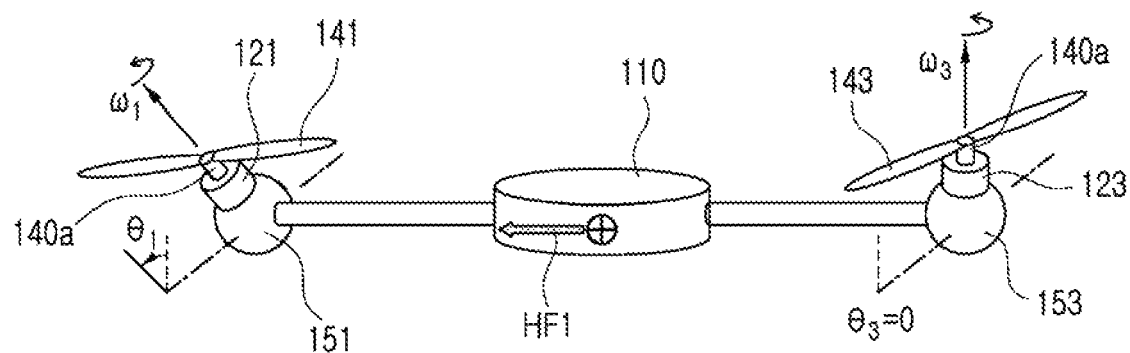
Figure 6:
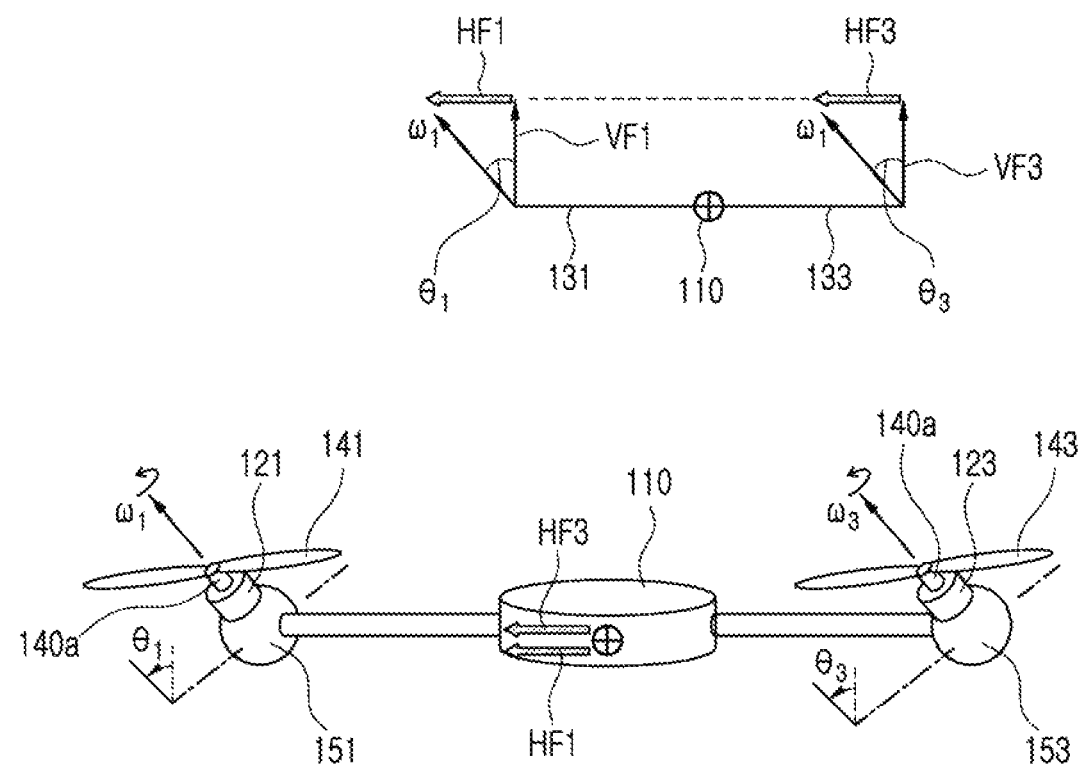
FIG. 6 is a view illustrating another example of the principle of the position movement of the unmanned aerial vehicle in FIG. 3.

FIG. 5 is a view illustrating an example of a principle of the position movement of the unmanned aerial vehicle in FIG. 3, and FIG. 6 is a view illustrating another example of the principle of the position movement of the unmanned aerial vehicle in FIG. 3.

As an example, as illustrated in FIG. 5, when a command of the movement to the left (leftward in FIG. 5) is inputted to the control module 113 from the external remote controller (not illustrated) through the communication module 112, the first tilting unit 151 is rotated so that the rotating shaft 140$a$ of the first propeller 141 is tilted from a right upper side to a left lower side (based on FIG. 5) through the tilt control unit 113$a$ of the control module 113, and the first and third propeller motors 121 and 123 are rotated by the control module 113 so that vertical components VF1 and VF3 of force in accordance with angular velocities of the first and third propellers 141 and 143 become substantially equal to each other. Therefore, the unmanned aerial vehicle is maintained approximately horizontality as the vertical component VF1 of the force generated by the first propeller 141 is substantially equal to the vertical component VF3 of the force generated by the third propeller 143, and the unmanned aerial vehicle translationally moves (denoted by HF1) to the left (leftward in FIG. 5) by a horizontal component HF1 of the force generated by the first propeller 141.

As another example, as illustrated in FIG. 6, when a command of the movement to the left (leftward in FIG. 6) is inputted to the control module 113 from the external remote controller through the communication module 112, the first and third tilting units 151 and 153 are rotated so that the rotating shafts 140$a$ of the first and third propellers 141 and 143 are tilted from the right upper side to the left lower side (based on FIG. 6) through the tilt control unit 113$a$ of the control module 113, and the first and third propeller motors 121 and 123 are rotated by the control module 113 so that the vertical components VF1 and VF3 of the force in accordance with the angular velocities of the first and third propellers 141 and 143 become substantially equal to each other. Therefore, the unmanned aerial vehicle is maintained horizontality as the vertical component VF1 of the force generated by the first propeller 141 is substantially equal to the vertical component VF3 of the force generated by the third propeller 143, and the unmanned aerial vehicle translationally moves (denoted by HF1 and HF3) to the left (leftward in FIG. 6) by the horizontal components HF1 and HF3 of the force generated by the first and third propellers 141 and 143.

Hereinafter, an unmanned aerial vehicle according to another exemplary embodiment of the present invention will be described with reference to FIG. 7.

Figure 7:
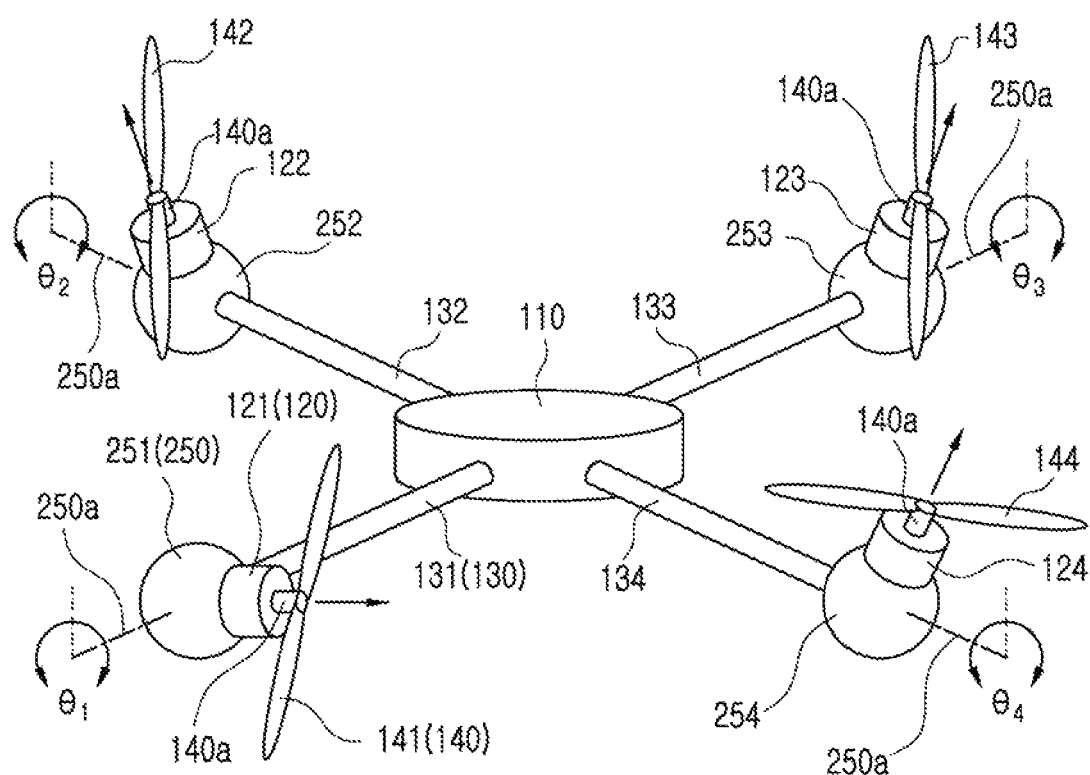
FIG. 7 is a perspective view schematically illustrating an unmanned aerial vehicle according to another exemplary embodiment of the present invention.

FIG. 7 is a perspective view schematically illustrating an unmanned aerial vehicle according to another exemplary embodiment of the present invention.

As illustrated in FIG. 7, because the unmanned aerial vehicle according to another exemplary embodiment of the present invention is identical to that of the aforementioned exemplary embodiment of the present invention except for tilting units 250, the tilting units 250 will be mainly described hereinafter.

The rotation axis 250$a$ of each of the tilting units 250 may be placed in a direction identical to the longitudinal direction of the each of the supports 130. Therefore, the principle that the unmanned aerial vehicle translationally moves while being maintained horizontality by a combination of the vertical component and the horizontal component of the force generated by the propeller 140 is identical to the principle described in the aforementioned exemplary embodiment of the present invention except that the rotating shaft 140a of each of the propellers 140 is tilted about an axis in the longitudinal direction of each of the supports 130.

In addition, as illustrated in FIG. 7, the single rotation axis 250a may be provided at each of the tilting units 250, and although not illustrated, multiple rotation axes 250a may be provided at each of the tilting units 250.

Hereinafter, an unmanned aerial vehicle according to yet another exemplary embodiment of the present invention will be described with reference to FIG. 8.

Figure 8:
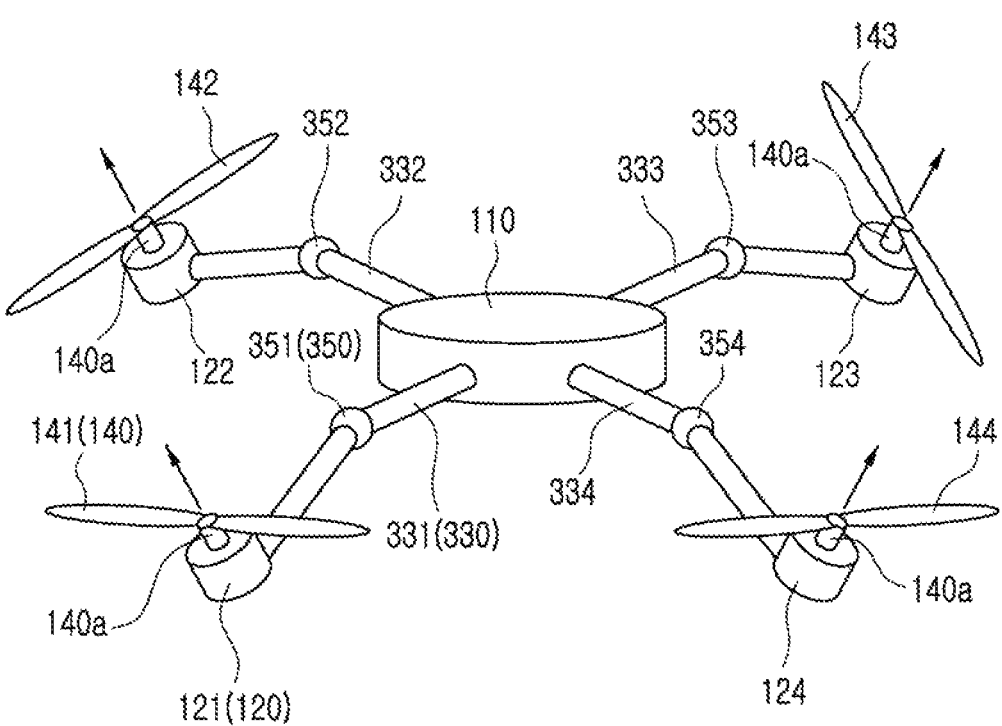
FIG. 8 is a perspective view schematically illustrating an unmanned aerial vehicle according to yet another exemplary embodiment of the present invention.

FIG. 8 is a perspective view schematically illustrating an unmanned aerial vehicle according to yet another exemplary embodiment of the present invention.

As illustrated in FIG. 8, because the unmanned aerial vehicle according to yet another exemplary embodiment of the present invention is identical to that of the aforementioned exemplary embodiment of the present invention except for supports 330 and tilting units 350, the supports 330 and the tilting units 350 will be mainly described hereinafter.

As illustrated in FIG. 8, each of the supports 330 may have two divided portions 330, and each of the tilting units 350 may be connected to a divided portion 330a. Therefore, the principle that the unmanned aerial vehicle translationally moves while being maintained horizontality by a combination of the vertical component and the horizontal component of the force generated by the propeller 140 is identical to the principle described in the aforementioned exemplary embodiment of the present invention except that each of the tilting units 350 is provided at the divided portions 330a of the each of the supports 330.

Hereinafter, an unmanned aerial vehicle according to still another exemplary embodiment of the present invention will be described with reference to FIGS. 9 to 12.

Figure 9:
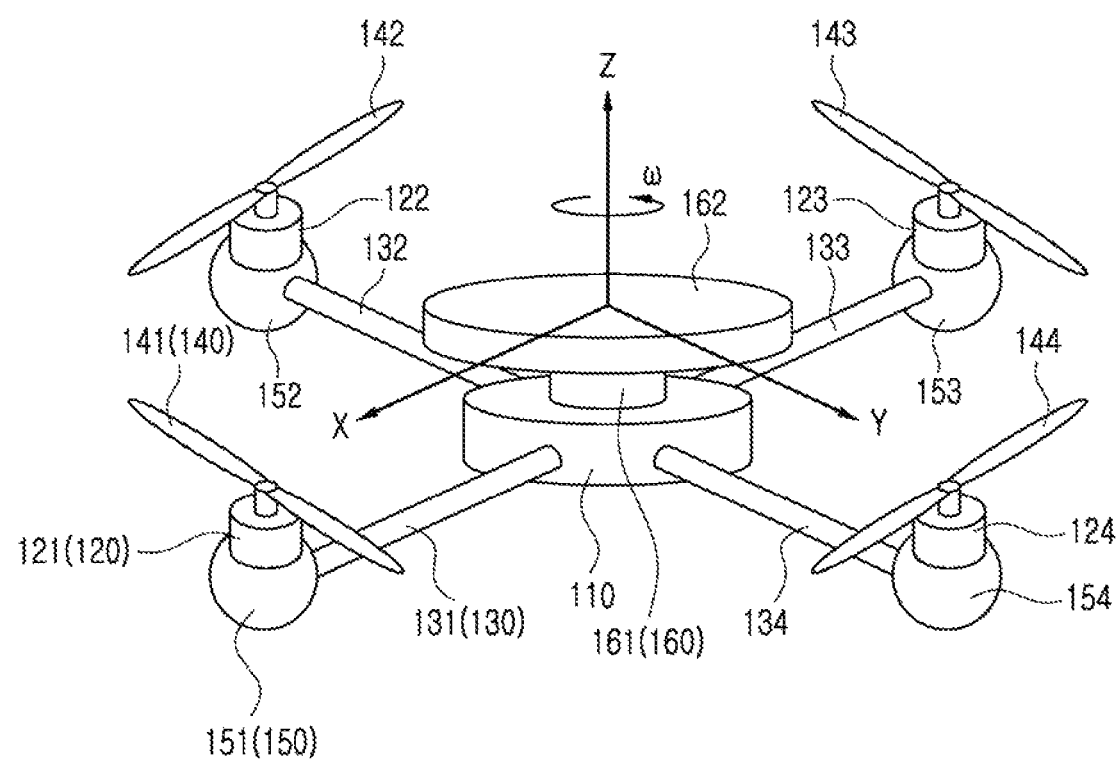
FIG. 9 is a perspective view schematically illustrating an unmanned aerial vehicle according to still another exemplary embodiment of the present invention.
Figure 10:
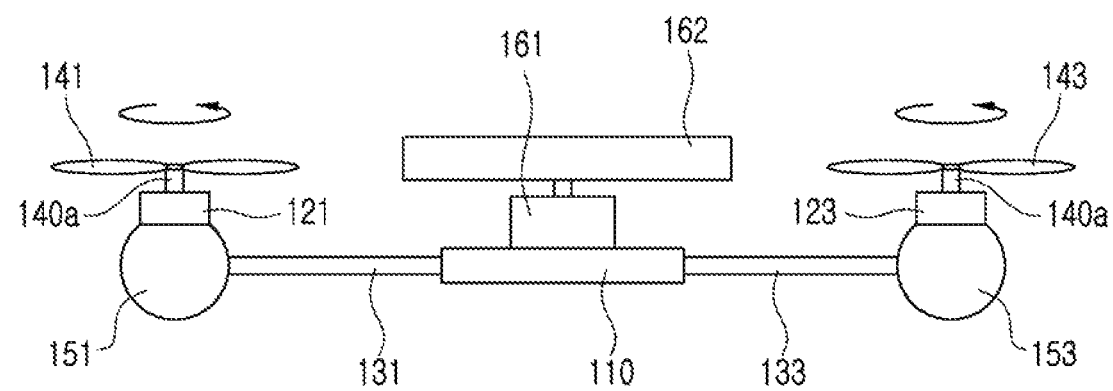
FIG. 10 is a view illustrating a state in which a maneuvering mode of the unmanned aerial vehicle in FIG. 9 is operated.
Figure 11:
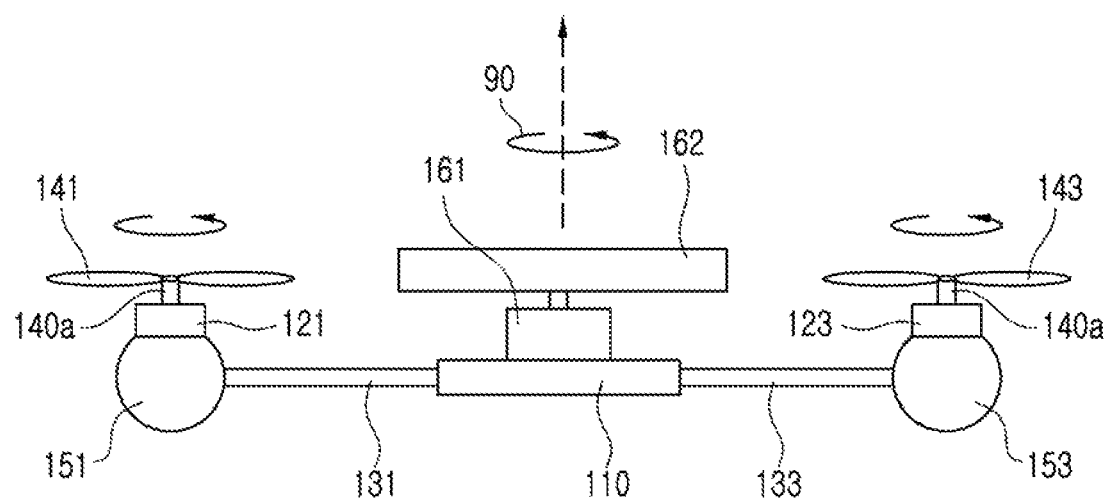
FIG. 11 is a view illustrating a state in which a posture maintaining mode of the unmanned aerial vehicle in FIG. 9 is operated.
Figure 12:
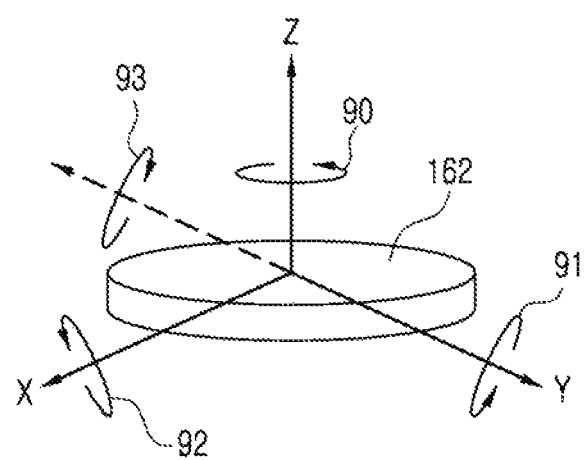
FIG. 12 is a view illustrating a posture stabilization principle of the posture maintaining mode of the unmanned aerial vehicle in FIG. 9.

FIG. 9 is a perspective view schematically illustrating an unmanned aerial vehicle according to still another exemplary embodiment of the present invention, FIG. 10 is a view illustrating a state in which a maneuvering mode of the unmanned aerial vehicle in FIG. 9 is operated, FIG. 11 is a view illustrating a state in which a posture maintaining mode of the unmanned aerial vehicle in FIG. 9 is operated, and FIG. 12 is a view illustrating a posture stabilization principle of the posture maintaining mode of the unmanned aerial vehicle in FIG. 9.

As illustrated in FIG. 9, because the unmanned aerial vehicle according to still another exemplary embodiment of the present invention is identical to that of the aforementioned exemplary embodiment of the present invention except that the main body unit 110 further has a horizontality maintaining unit 160, the horizontality maintaining unit 160 will be mainly described.

The horizontality maintaining unit 160 serves to maintain the horizontal posture of the main body unit 110 even though external force is applied due to disturbance in a state in which the unmanned aerial vehicle is in the air. For example, as illustrated in FIG. 9, the horizontality maintaining unit 160 may include a flywheel motor 161 and a flywheel 162 in order to generate momentum.

The flywheel motor 161 may be provided on an upper surface or a lower surface of the main body 111, and the flywheel 162 may be axially coupled to the flywheel motor 161 and rotated by the flywheel motor 161. Further, a rotation axis of the flywheel 162 may be perpendicular to the upper surface of the main body 111.

Hereinafter, a posture stabilization principle of the horizontality maintaining unit 160 will be described with reference to FIGS. 10 to 12.

In a maneuvering mode in which the unmanned aerial vehicle is moved, the rotation of the flywheel 162 is stopped as illustrated in FIG. 10. Therefore, momentum by the flywheel 162 is not generated, and as a result, the unmanned aerial vehicle may be moved by using thrust of the propellers 140.

In a station keeping mode, momentum (denoted by 90) is generated by rotating the flywheel 162 at a high speed, as illustrated in FIG. 11. In this case, as illustrated in FIG. 12, in a case in which the posture of the unmanned aerial vehicle is disturbed (denoted by 91) as external force (Y-axis) is generated, torque (denoted by 92) is generated by a principle of gyroscopic force, and a change in posture (X-axis) generated accordingly is coupled to the momentum (denoted by 90), thereby generating gyroscopic force (denoted by 93) that restores the initially disturbed posture (denoted by 91), and as a result, it is possible to stably maintain the posture. This principle is the same principle when a top maintains the posture by generating restoring force with respect to external force.

As described above, the unmanned aerial vehicle according to the exemplary embodiments of the present invention may have the following effects.

According to the exemplary embodiments of the present invention, there is provided the technical configuration including tilting units 150, 250, and 350 for tilting the rotating shafts 140a of the propellers 140 with respect to the main body unit 110, such that the position movement is enabled by means of the propellers 140 rotated by the tilting units 150, 250, and 350 without tilting the main body unit 110, and as a result, it is possible to move the position of the unmanned aerial vehicle while maintaining posture stabilization of the main body unit 110.

Therefore, for example, it is possible to improve stability against collision of the unmanned aerial vehicle because the main body unit is not tilted in a case in which distances and heights between the unmanned aerial vehicles positioned in a front and rear direction, an up and down direction, or a left and right direction are adjusted during a group flight when a number of unmanned aerial vehicles fly, it is possible to improve docking accuracy and reduce the time required for the docking because the main body unit is not tilted in a case in which the unmanned aerial vehicle docks with another unmanned aerial vehicle in the air, it is possible to improve operation precision and reduce operation time because the main body unit is not tilted in a case in which various tasks or operations between the air and the ground such as aerial photographing are performed, and particularly, it is possible to improve quality of captured images by reducing geometric distortion when performing photographing.

In addition, according to the exemplary embodiments of the present invention, the horizontality maintaining unit 160 is further included, and as a result, it is possible to maintain the posture stabilization even though external force is applied due to disturbance.

Although preferred examples of the present invention have been described in detail hereinabove, the right scope of the present invention is not limited thereto, and it should be clearly understood that many variations and modifications of those skilled in the art using the basic concept of the present invention, which is defined in the following claims, will also belong to the right scope of the present invention.

INDUSTRIAL APPLICABILITY

The present invention has industrial applicability because the unmanned aerial vehicle of the present invention may be used for military purposes, high-altitude aerial photographing, delivery, and the like.

The invention claimed is:

1. An unmanned aerial vehicle comprising:
a main body unit;
a plurality of propeller motors of which the rotational speed is adjusted by the main body unit;
supports which extend from the main body unit in order to support the plurality of propeller motors;
propellers which are axially coupled to the plurality of propeller motors and output thrust; and
tilting units which tilt rotating shafts of the propellers with respect to the main body unit,
wherein the main body unit includes
a main body which defines an external appearance;
a communication module which is provided in the main body and communicates with an external remote controller; and
a control module which is provided in the main body and controls the plurality of propeller motors, the control module further includes a tilt control unit which controls the tilting units,
wherein the main body unit further includes a horizontality maintaining unit which maintains a horizontal posture of the main body unit when the unmanned aerial vehicle is in the air,
wherein the horizontality maintaining unit includes
a flywheel motor which is provided on the main body unit; and
a flywheel which is axially coupled to the flywheel motor,
wherein in response to detection of a signal, transmitted via the communication module, to move the unmanned aerial vehicle to a certain direction, the control module stops the flywheel motor and rotates the tilting units to tilt one of the tilt rotating shafts of one of the propellers with respect to the main body unit, and wherein
in response to detection of a signal to stop the unmanned aerial vehicle, the control module operates the flywheel motor to maintain the unmanned aerial vehicle in a horizontal direction.

2. The unmanned aerial vehicle of claim 1, wherein a rotation axis of each of the tilting units is perpendicular to the rotating shaft of each of the propellers.

3. The unmanned aerial vehicle of claim 1, wherein each of the tilting units has a single rotation axis or multiple rotation axes.

4. The unmanned aerial vehicle of claim 1, wherein each of the tilting units is provided between each of the supports and each of the propeller motors.

5. The unmanned aerial vehicle of claim 1, wherein each of the supports has two divided portions, and each of the tilting units is connected to each of the divided portions.

6. The unmanned aerial vehicle of claim 1, wherein the main body unit includes:
a sensor module which is provided in the main body and includes a camera; and
a battery which is provided in the main body and supplies electric power to the communication module, the control module, and
the sensor module.

7. The unmanned aerial vehicle of claim 1, wherein a rotation axis of the flywheel is perpendicular to an upper surface of the main body unit.

* * * * *